May 11, 1965 S. S. SCHACHT 3,182,949
FINGERLESS DUCT SPACER FOR SQUIRREL CAGE ROTOR
Filed Jan. 29, 1962 3 Sheets-Sheet 1

INVENTOR.
STERLING S. SCHACHT
BY Woodling, Krost,
Granger and Rust
ATTORNEYS

May 11, 1965   S. S. SCHACHT   3,182,949
FINGERLESS DUCT SPACER FOR SQUIRREL CAGE ROTOR
Filed Jan. 29, 1962   3 Sheets-Sheet 2
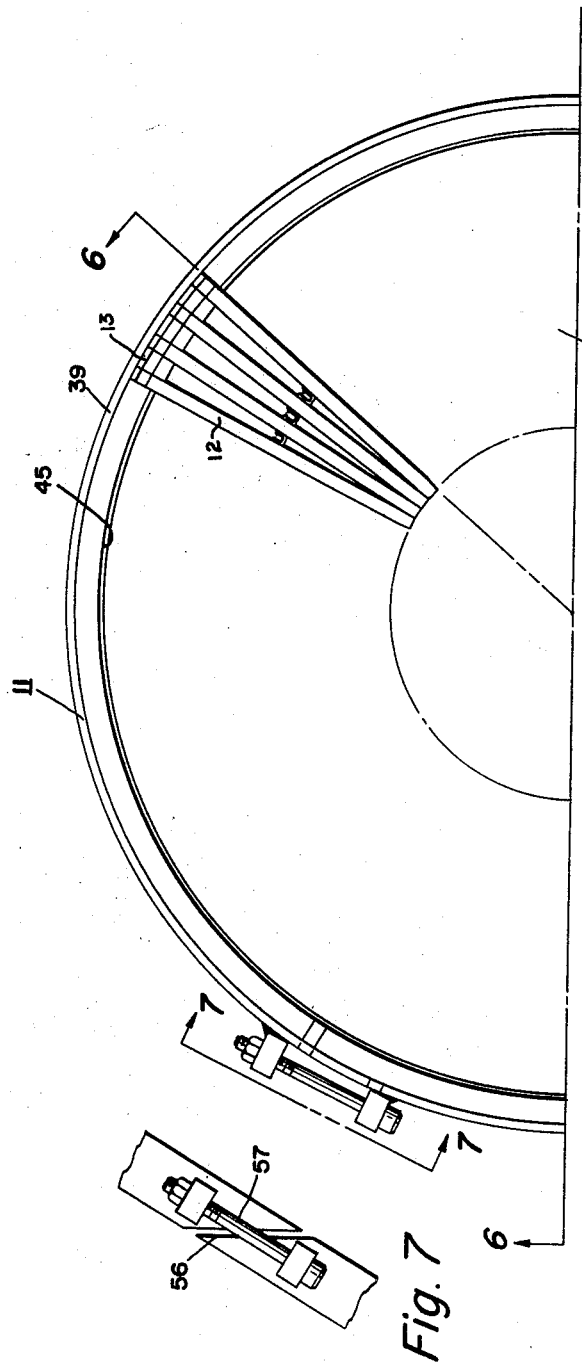
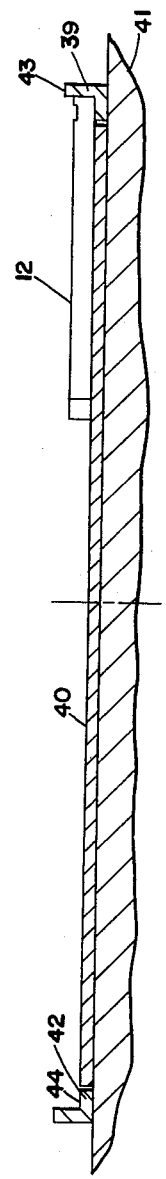
INVENTOR.
STERLING S. SCHACHT
BY Woodling, Krost,
Granger and Rust
ATTORNEYS May 11, 1965 S. S. SCHACHT 3,182,949
FINGERLESS DUCT SPACER FOR SQUIRREL CAGE ROTOR
Filed Jan. 29, 1962 3 Sheets-Sheet 3

INVENTOR.
STERLING S. SCHACHT
BY *Woodling, Kroet,*
*Granger and Rust*
ATTORNEYS

United States Patent Office 3,182,949
Patented May 11, 1965

3,182,949
FINGERLESS DUCT SPACER FOR SQUIRREL CAGE ROTOR
Sterling S. Schacht, Twinsburg, Ohio, assignor to The Reliance Electric & Engineering Company, a corporation of Ohio
Filed Jan. 29, 1962, Ser. No. 169,502
6 Claims. (Cl. 249—60)

The invention relates in general to temporary spacers for forming fingerless ducts in squirrel cage rotors and, more particularly, to a temporary spacer assembly which may be more readily removed from a laminated squirrel cage rotor after the squirrel cage is diecast in such rotor.

The prior art has shown different forms of squirrel cage rotors with vent passages to promote cooling of the squirrel cage rotor. Heat is built up in the squirrel cage rotor of an induction motor or generator since the squirrel cage acts as a short-circuited second winding of a transformer. To promote proper operation and increased rating of such an induction machine, air vent passages are desirable, especially in the larger machines, to properly cool the rotor.

Special laminations with fingers to provide a finger formed radial ventilating duct have been used for many years as shown in the Patent 2,176,871 of F. E. Harrell. Fingerless duct rotors have also been tried in the prior art but have been difficult to make satisfactorily. A fingerless duct rotor has been proposed wherein finger dies were inserted through a plurality of apertures in a plurality of planes in a cylindrical holder surrounding the rotor. This method had several deficiencies, including the one of permitting only a single spacing of the planes of the radial ventilating ducts for any given cylindrical holder. Also, the radial apertures in such cylindrical holder would preclude easy removal of the individual finger dies when any large amount of axial compressive force was used on the laminated rotor, as is customary practice today. Such practice today is to diecast molten metal into the slots in a laminated rotor to form the squirrel cage with the rotor laminations being held under an axial compressive force of from 1500 to 10,000 p.s.i. This axial force is necessary to resist the casting pressure where the molten metal is diecast into the mold cavity and rotor slots under high pressures. High pressures are, of course, desired in order to completely fill the mold cavity quickly without any voids.

The prior art has also proposed removable finger dies which were L-shaped or T-shaped with the head at the outer end and each finger die abutting the peripherally adjacent finger dies. With the present day system of high axial pressures on the laminated rotor, this would mean that the four sides of each finger die had a high frictional contact, two sides with the laminations and the remaining two sides with contiguous finger dies to make it extremely difficult to remove the finger dies after casting the squirrel cage in the laminated rotor.

Accordingly, an object of the invention is to provide a temporary spacer assembly for a ventilating duct in a squirrel cage rotor which obviates the above disadvantages.

Another object of the invention is to provide a temporary spacer for forming a radial ventilating duct which is easier and more economical to manufacture and which uses less material.

Another object of the invention is to provide a ventilating duct temporary spacer assembly which is easier to assemble and use in the manufacture of a squirrel cage rotor.

Another object of the invention is to provide a ventilating duct temporary spacer having finger dies which are less likely to be bent and damaged.

Another object of the invention is to provide a ventilating duct temporary spacer assembly in which finger dies are utilized which have less friction with the complete rotor and, hence, may be more easily removed.

Another object of the invention is to provide clamp ring means to clamp a plurality of individual parts in place to form a temporary spacer assembly which is arch-bound to permit handling as a unit.

Another object of the invention is to provide a clamp ring for a ventilating duct temporary spacer which clamp ring holds individual parts to resist the diecasting pressure.

Another object of the invention is to provide a clamp ring which makes a unitary assembly of a ventilating duct temporary spacer so that this unitary assembly is used throughout the manufacturing process of forming the squirrel cage rotor until the spacer assembly is ready to be disassembled.

Another object of the invention is to provide a spacer assembly which permits flexibility in axial spacing of radial ventilating ducts in a laminated squirrel cage rotor.

Other objects and a fuller understanding of the invention may be had by referring to the following description and claims, taken in conjunction with the accompanying drawings, in which:

FIGURES 5 and 6 are top and sectional views to a reduced scale of the assembly procedure of the temporary spacer assembly;

FIGURE 7 is a partial view on line 7—7 of FIGURE 5;

Figure 1:
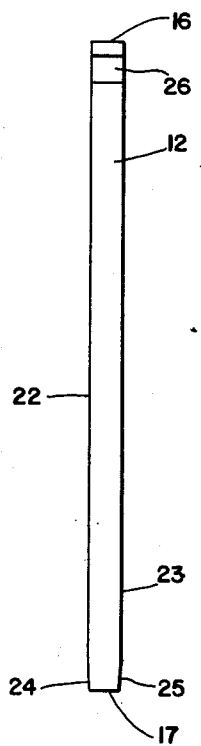
FIGURES 1 and 2 are top and side views of a removable finger die used in the invention.
Figure 2:
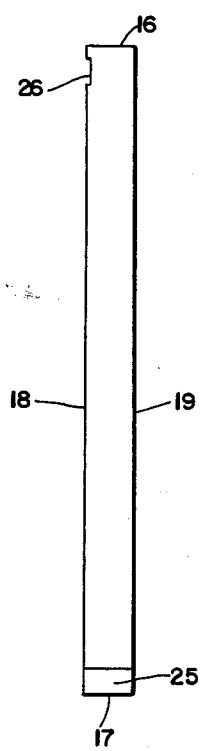
Figure 3:
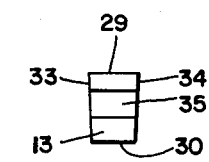
FIGURES 3 and 4 are top and side views of a removable insert.
Figure 4:
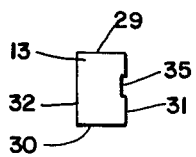

The figures of the drawing show a temporary spacer assembly 11, including generally, a plurality of removable finger dies 12 and a plurality of removable inserts 13. The temporary spacer assembly 11 is shown in partial view in FIGURE 8. One of the removable dies 12, which are all identical, is shown in FIGURES 1 and 2. FIGURES 3 and 4 show one of the identical removable inserts 13.

The removable finger dies 12 are of substantially rectangular cross section throughout and have an outer end 16 and an inner end 17. Each finger die has an upper surface 18 and a lower surface 19 with these two surfaces being slightly tapered, that is, slightly closer together at the inner end 17 than at the outer end 16. The slight taper might be a difference of about .010″ in height of this finger die 12 which is the dimension parallel to the axis 20 of the complete rotor 21, see FIGURE 10. The finger dies each have two opposite side surfaces 22 and 23 which are substantially parallel throughout substantially the entire length of each finger die. The inner end of each finger die may have tapered mating surfaces 24 and 25 on opposite sides for engagement with contiguous finger dies when all are nested in the complete temporary spacer assembly 11. A removal tool notch 26 may be provided on the outer end of each finger die 12 in that portion of the finger die which extends outboard of the laminations of the rotor 21.

Each removable insert 13 has an outer end 29 and an inner end 30 and upper and lower surfaces 31 and 32, respectively. Each insert 13 has opposite side surfaces 33 and 34, respectively, and the upper surface 31 may contain a removal tool notch 35. The upper and lower surfaces 31 and 32 are preferably parallel. The side surfaces 33 and 34 are tapered to be closer together at the inner end 30 than at the outer end 29. This tapering of the side surfaces 33 and 34 permits them to lie in intimate contact with the contiguous side surfaces 22 and 23 of the removable finger dies 12.

Figure 8:
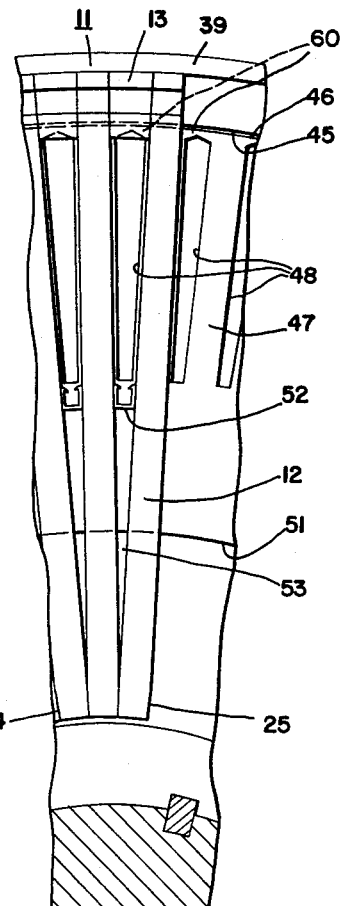
FIGURE 8 is a partial sectional view of the spacer assembly mounted on a group of rotor laminations ready for diecasting.
Figure 10:
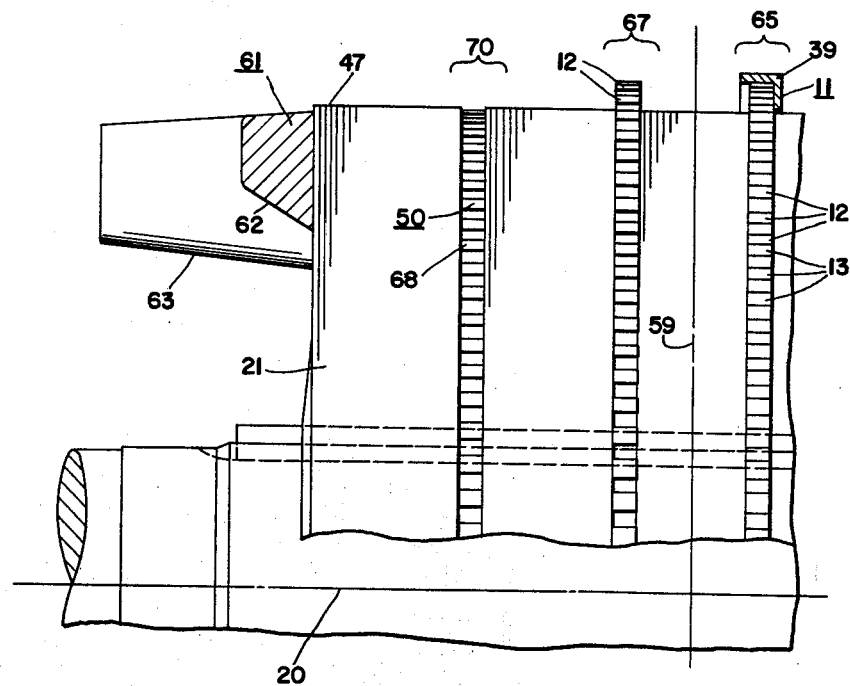
Figure 9:
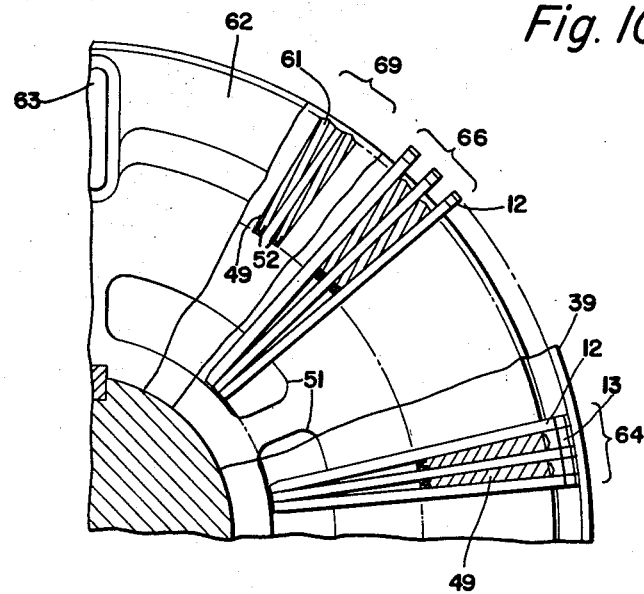
FIGURE 9 is a partial end and sectional view of the laminated rotor after diecasting and in various stages of disassembly; and, FIGURE 10 is a partial longitudinal view of the rotor of FIGURE 9, also in various stages of disassembly.

FIGURES 5, 6 and 7 show how the temporary spacer assembly 11 may be readily assembled and it includes a split clamp ring 39. A circular plate 40 may be supported on a table or other support 41. The split clamp ring 39 is generally L-shaped in cross section with a lower flange 42 and an outer peripheral shoulder 43. The thickness of the flange 42 is the same as that of the plate 40 and, thus, provides a planar surface 44 to support the outer end of the removable finger dies 12 and the removable inserts 13. The inside diameter 45 of the lower flange 42 closely encircles the plate 40 and also closely encircles the outside diameters 46 of the rotor laminations 47 when assembled in the complete rotor 21, as shown in FIGURES 8, 9 and 10. The assembler utilizes the plate 40 and the split clamp ring 39 to alternately assemble the finger disc 12 and removable inserts 13. The width of the finger dies 12 and inserts 13 is, of course, governed by the peripheral spacing of the longitudinal slots 48 in the rotor laminations 47. Preferably, the spacing between adjacent finger dies 12 is made slightly greater than the peripheral width of the slot 48. Thus, when the diecast metal forming the squirrel cage bars is diecast into the complete rotor 21, the rotor bars 49 filling the slots 48 at each of the radial ventilating ducts 50 is peripherally wider than the slot in the lamination to thus key the rotor bars 49 to the laminations 47 and prevent expansion and loosening of the individual laminations 47.

After the complete circle of finger dies 12 and removable inserts 13 have been put in place, then the mating surfaces 24 and 25 at the inner ends of the finger dies 12 will be in engagement. Where axial ventilating ducts 51 are used in the rotor 21, then clips 52 may also be inserted in the spacer assembly 11. These clips 52 prevent radial inward flow of the diecast metal to the point where such metal would flow into the axial ducts 51. In those cases where the peripheral width of the slot 48 is large relative to the peripheral width of the finger dies 12, then the individual finger dies 12 must be made long and extend relatively close to the rotor axis 20. In such case, there is a space 53 between the finger dies 12 which merges with the axial vent ducts 51. The use of the clips 52 prevents diecast metal from flowing into this space 53, and hence into the axial vent ducts 51.

The clamp ring 39 is split preferably along an angular cut 56. A bolt and nut means 57 may be used to tighten the split clamp ring 39 together to arch bind together all the finger dies 12 and removable inserts 13. There may be in the order of 50 to 100 of these finger dies 12, and the same number of inserts 13 in any given spacer assembly 11. This number will, of course, be equal to the number of slots 48 with the larger numbers usually being used in larger diameter rotors, for example, from twelve to eighteen inches in diameter. When the bolt and nut means 57 is tightened, then this brings the tapered side surfaces 33 and 34 of each of the inserts into intimate engagement with the contiguous finger dies 12. The entire assembly is arch-bound together so that it may be handled as a unit. This unit of the temporary spacer assembly 11 may then be placed on a stack of a group of laminations 47, as shown in FIGURE 8, and rotated slightly to have the spaces between finger dies 12 aligned with the rotor slots 48. Another group of laminations may then be placed on top, preferably as centered on a mandrel 58. FIGURE 10 shows the flexibility of using these unitary spacer assemblies 11, in that the rotor 21 has a longitudinal center line 59, and these spacer assemblies 11 between groups of laminations may be spaced longitudinally at varying distances. Since the greatest heat is usually at the longitudinal center plane of the rotor, these spacer assemblies 11 are preferably placed more closely together at the longitudinal center of the rotor to, thus, provide radial ventilating ducts spaced more closely near the center of the rotor. As assembled between the rotor laminations, as shown in FIGURE 8, the finger dies 12 plus removable inserts 13 form a mold means to restrict flow of the diecasting material. Also included as a part of this mold means is the touching of the mating surfaces 24 and 25 and the clips 52.

In accordance with general practice of induction dynamoelectric machines, the rotor laminations have the slots 48 punched therein such that it is initially a closed slot at the outer end. A small bridge 60 of the laminations 47 is provided at the radial outboard end of each slot. This may be only in the order of .030 to .100 inch. This is a small area of each lamination with which the upper and lower surfaces of the inserts 13 are in engagement. These upper and lower surfaces 31 and 32 of the inserts 13 are preferably parallel to assure good contact with the rotor laminations in this small area. A seal is required in these areas to provide the mold means which restricts flow of the diecast metal. Since the diecasting pressure may be in the order of 1500 to 10,000 p.s.i., there is considerable outward force on each of these inserts 13 and this is resisted by the clamp ring 39. The radially inward pressure of the diecast metal is resisted by the clip 52 when used and, if not used, then is resisted by the mating surfaces 24 and 25. The clips 52 preferably have a longitudinal dimension slightly greater than the longitudinal dimension between the upper and lower surfaces 18 and 19 of each finger die 12. This assures that the clips 52 bite into the metal of the lamination 47 for good sealing engagement therewith. Also, this helps the removal of the finger dies 12 after diecasting of the squirrel cage 61.

The unitary spacer assemblies 11 are placed between groups of laminations 47, as shown in FIGURE 8, and the upper and lower surfaces of these spacer assemblies 11 may be coated with aquadag or other satisfactory mold parting agent. These groups of laminations and spacer assemblies 11 may then be placed in a diecasting press which accepts the mandrel 58 and axially compressed, then the squirrel cage 61 may be diecast from suitable material such as aluminum or alloys thereof. This diecasting, as is customary practice today, is usually carried out under high pressures to quickly fill the rotor slots 48 and to form the end rings 62 and fan blades 63 without any voids. The clamp ring 39 thus resists this high diecasting pressure.

After diecasting of the squirrel cage 61, the temporary spacer assemblies 11 may be removed. FIGURES 9 and 10 show the progressive disassembly of the spacer assemblies 11. Area 64 in FIGURE 9 and area 65 in FIGURE 10 show the rotor 21 with the clamp ring 39 still in place. First, the split clamp ring 39 may be removed by loosening the bolt and nut means 57. Next, the removable inserts 13 may be readily removed. Each insert has a tool removal notch 35 which may be grasped by any suitable removal tool such as lock joint pliers. Two factors permit ready removal of these inserts 13, namely, the tapered sides 33 and 34 thereon plus the fact that each insert has only a small area of contact with adjacent rotor laminations at the metal bridge 60. This bridge is only about .030 to .100 inch in a radial dimension, thus, the inserts may be readily and quickly removed. The area 66 of FIGURE 9 and area 67 of FIGURE 10 show the rotor 21 with the clamp ring 39 and inserts 13 removed. Once the inserts 13 are removed, then the removable finger dies 12 are much more easily removed. Again, each finger die 12 may be grasped with a slidable tool at the tool removal notch 26 and pulled radially outwardly. The tapered upper and lower surfaces of each finger die aid this removal and the fact that the removable inserts 13 have been removed is a big factor. Since each finger die 12 is straight without any outer head, the operator can obtain a straight radial pull on each finger die 12 so that even if each finger die is quite long and slender, there is no tendency to bend such finger dies, which would, of course, destroy its usefulness. When the individual clips 52 are used, these help keep the adjacent laminations 47 separated slightly longitudinally to help removal of each finger die 12. Also, the use of aquadag or other parting agent helps the sliding of these finger dies. As the squirrel cage cools, it will shrink. The squirrel cage 61 cannot shrink too much, however, because some of the finger dies 12 will still be in place. Thus, the rotor bars 49 will be placed under stress and will cool in this stressed condition. The rotor 21 may then be placed in a reheat furnace to reheat the rotor. This will lengthen the rotor bars 49 sufficiently so that when the rotor 21 is again removed from the furnace, the remaining finger dies are considerably easier to remove than the first finger dies removed. This permits ready removal of the finger dies 12.

An alternative method of removal of the dies 12 and inserts 13 is to grasp one insert 13 and one die 12 at the same time and remove both together. Because of the tapered surfaces 33 and 34 on the inserts 13, it is found that the frictional contact between contiguous dies 12 and inserts 13 is quickly broken upon initial outward movement and, thus, one pair of a die 12 and insert 13 may be readily removed. The operator may then proceed around the periphery of the rotor removing such pairs in sequence. When all the finger dies 12 are removed, the rotor 21 then appears as at area 69 in FIGURE 9 and area 70 in FIGURE 10. Removal of the finger dies 12 forms a plurality of individual radial ducts 68 which together establish a radial ventilating duct 50 in a single plane. There may be a plurality of these radial ventilating ducts 50 spaced along the axis 20 to properly cool the rotor 21.

The finger dies 12 may be easily and quickly manufactured. They are of generally rectangular solid shape and, hence, may be cut from flat, ground stock. The tapered mating surfaces 24 and 25 may be ground to the proper angle and then the top and bottom surfaces 18 and 19 may be ground to provide the slight taper therebetween. The removal tool notch 26 may be formed in the individual pieces or may be milled, for example, in a group of pieces placed side by side either before or after cutting apart to form the individual finger dies 12.

The removable inserts 13 are also simply and easily manufactured. Flat bar stock may be used having a width equal to the dimension between outer and inner ends 29 and 30 and a thickness equal to the dimension between upper and lower surfaces 31 and 32. The removal tool notch 35 may then be milled in one face along the length of the flat bar stock. The individual inserts 13 may then be formed by ctuting this flat bar stock into pieces and grinding the taper to form the two side surfaces 33 and 34. Accordingly, the finger dies 12 and removable inserts 13 are much easier to manufacture than they would be if the finger dies had an enlarged head at the outer end thereof. Also, the finger dies 12 are much easier to remove from the completed rotor 21 because of the separate and easily removable inserts 13. The finger dies 12 and inserts 13 are easy to assemble by an assembler on a bench using the plate 40 as shown in FIGURES 5 and 6. When the spacer assembly 13 is completely assembled and the split clamp ring tightened, then this spacer assembly 11 becomes a unitary assembly which may be readily handled without any special precautions and, hence, may be readily stacked on the mandrel 58 between groups of laminations 47. Such a unitary spacer assembly 11 permits complete flexibility in the longitudinal spacing of the radial ventilating ducts 50 along the axis 20. The generally rectangular cross section throughout the length of the finger dies 12 without any enlarged head at the end thereof means that the workman can obtain a straight radial pull on the finger die 12 for removal of this finger die. This means that even though the finger die be long and slender, there is no tendency to apply a force which will bend the finger die and, thus, they have a long life.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A temporary and removable spacer for forming a radial ventilating duct between adjacent laminations in a laminated squirrel cage rotor to be provided with conductor bars cast in aligned slots in annular laminations of predetermined outer diameter.

said spacer comprising, in combination, a first plurality of removable finger dies disposed between said adjacent laminations, a second plurality of removable inserts disposed between said adjacent laminations in engagement with a small area of said adjacent laminations outboard of the slots, said finger dies and said inserts alternating around the outer periphery of the laminations, the two opposite sides of said inserts adapted to engage the sides of adjacent finger dies, means including the inboard end of said inserts and said two sides of said finger dies adapted to form mold means restricting the flow of casting material forming the conductor bars, and said inserts being readily removable after casting said squirrel cage because of the small area of contact with said laminations and hence aiding ready removal of said finger dies by minimization of friction with adjacent side surfaces.

2. A temporary and removable spacer for forming a radial ventilating duct between adjacent laminations in a laminated squirrel cage rotor to be provided with conductor bars cast in aligned slots in annular laminations of predetermined outer diameter, said spacer comprising, in combination, a first plurality of removable finger dies disposed between said adjacent laminations, a second plurality of removable inserts disposed between said adjacent laminations, said finger dies and said inserts alternating around the outer periphery of the laminations, each finger die being substantially parallel throughout the length thereof on the two opposite sides thereof, both said finger dies and said inserts having an outer end projecting beyond the outer diameter of said laminations, the two opposite sides of said inserts being tapered from the outer end thereof toward the center of said laminations to lie in substantially intimate contact with the sides of adjacent finger dies.

the inboard end of the upper and lower surfaces of said inserts being in engagement with a small area of said adjacent laminations outboard of the slots, means including the inboard end of said inserts and said two sides of said finger dies adapted to form mold means restricting the flow of casting material forming the conductor bars, and said inserts being readily removable after casting said squirrel cage because of the small area of contact with said laminations and the tapered sides on said inserts and hence aiding ready removal of said finger dies by minimization of friction with adjacent side surfaces.

3. A temporary spacer assembly for forming a radial ventilating duct between adjacent laminations in a laminated squirrel cage rotor to be provided with conductor bars cast in aligned slots in annular laminations, said spacer assembly comprising, in combination, a first pluarality of removable finger dies disposed between said adjacent laminations, a second plurality of removable inserts disposed between said adjacent laminations in engagement with only a small area of said adjacent laminations outboard of the slots to minimize frictional contact therewith, said finger dies and said inserts alternating around the periphery of the laminations, both said finger dies and said inserts having an outer end projecting beyond the periphery of said laminations, the two opposite sides of said inserts adapted to engage the sides of adjacent finger dies, said spaced assembly including clamp ring means to clamp the outer radial end of said finger dies and inserts and arch bind same together, and means including the inboard end of said inserts and said sides of said finger dies to form mold means restricting the flow of casting material forming the conductor bars.

4. A temporary spacer assembly for forming a radial ventilating duct between adjacent laminations in a laminated squirrel cage rotor to be provided with conductor bars cast in aligned slots in annular laminations of predetermined outside diameter, said spacer assembly comprising in combination, a first plurality of removable finger dies disposed between said adjacent laminations.

a second plurality of removable inserts disposed between said adjacent laminations, said finger dies and said inserts alternating around the periphery of the laminations, both said finger dies and said inserts having an outer end projecting beyond the periphery of said laminations, the two opposite sides of said inserts being tapered from the outer end thereof toward the center of said laminations to lie in substantially intimate contact with the sides of adjacent finger dies, the inboard end of the upper and lower surfaces of said inserts being in engagement with only a small area of said adjacent laminations in the area outboard of the slots in said laminations to minimize frictional contact therewith, means including the inboard end of said inserts and said sides of said finger dies to form mold means restricting the flow of casting material forming the conductor bars, said spacer assembly including a split clamp ring having an outer susbtantially annular shoulder arranged to abut the outer radial end of said finger dies and inserts, said clamp ring having a planar surface adapted to abut the lower side of the outer end of said finger dies and inserts, screw means to clamp said split clamp ring in position and arch-binding together said plurality of finger dies and plurality of inserts, said clamp ring and plurality of finger dies and inserts forming a unitary spacer assembly for insertion as a unit between first and second groups of laminations, and said clamp ring having an inner diameter adapted to closely surround the outside diameter of the laminations.

5. A temporary and removable spacer for forming a radial ventilating duct between adjacent laminations in a laminated squirrel cage rotor to be provided with conductor bars cast in aligned slots in annular laminations of predetermined outer diameter, said spacer comprising, in combination, a first plurality of removable finger dies of susbtantially rectangular cross section throughout disposed between said adjacent laminations, a second plurality of removable inserts of substantially rectangular cross section throughout disposed between said adjacent laminations, said finger dies and said inserts alternating around the outer periphery of the laminations, each finger die being slightly tapered on the two upper and lower sides in contact with the adjacent laminations, each finger die being substantially parallel throughout substantially the entire length thereof on the two remaining opposite sides, both said finger dies and said inserts having an outer end projecting beyond the outer diameter of said laminations, the upper and lower sides of said inserts being substantially parallel, the two remaining opposite sides of said inserts being tapered from the outer end thereof toward the center of said laminations to lie in substantially intimate contact with the sides of adjacent finger dies, the inboard end of said upper and lower surfaces of said inserts being in engagement with a small area of said adjacent laminations outboard of the slots, separate metal clips disposed between said adjacent laminations and between said two remaining sides of said finger dies inboard of said slots, means including said clips and the inboard end of said inserts and said two remaining sides of said finger dies adapted to form mold means restricting the flow of casting material forming the conductor bars, a removal tool notch on each finger die and insert outboard of said laminations for grasping by a tool for radial removal of said finger dies and inserts, and said inserts being readily removable after casting said squirrel cage because of the small area of contact with said laminations and the tapered sides on said inserts and hence aiding ready removal of said finger dies by minimization of friction with adjacent side surfaces.

6. A temporary and removable spacer assembly for forming a radial ventilating duct between adjacent groups of laminations in a laminated squirrel cage rotor to be provided with conductor bars cast in aligned slots in annular laminations of predetermined outer diameter.

said spacer assembly comprising, in combination, a first plurality of removable finger dies of susbtantially rectangular cross section throughout disposed between said adjacent laminations, a second plurality of removable inserts of susbtantially rectangular cross section throughout disposed between said adjacent laminations, said finger dies and said inserts alternating around the outer periphery of the laminations, each finger die being slightly tapered on the two upper and lower sides in contact with the adjacent laminations, each finger die being substantially parallel throughout substantially the entire length thereof on the two remaining sides, said two remaining sides adapted to form die means restricting the flow of casting material forming the conductor bars and also at the outer ends thereof lying in substantially intimate contact with the adjacent inserts, means including separate metal clips disposed between said adjacent laminations and between said two remaining sides of said finger dies inboard of said slots restricting radially inward flow of casting material between said finger dies, the upper and lower sides of said inserts being substantially parallel, the two opposite side surfaces of said inserts being tapered from the outer end thereof toward the center of said laminations to lie in substantially intimate contact with the sides of adjacent finger dies, both said finger dies and said inserts having an outer end projecting beyond the outer diameter of said laminations and carried in a split clamp ring, said clamp ring having an outer substantially annular shoulder arranged to abut the outer radial end of said finger dies and inserts, said clamp ring having a planar surface adapted to abut the lower side of the outer end of said finger dies and inserts, screw means to clamp said split clamp ring in position and arch-bind together said plurality of finger dies and plurality of inserts, said clamp ring and plurality of finger dies and inserts forming a unitary spacer assembly for insertion as a unit between first and second groups of laminations, said clamp ring having an inner diameter adapted to closely surround the outside diameter of the lower group of laminations, a removal tool notch on each finger die and insert outboard of said laminations for grasping by a tool for radial removal of said finger dies and inserts, said inserts having an inboard end of said upper and lower surfaces in engagement with only a small area of said adjacent laminations in the area outboard of the slots in said laminations to minimize frictional contact therewith.

References Cited by the Examiner

UNITED STATES PATENTS

| | | | |
|---|---|---|---|
| 1,669,071 | 5/28 | Thomas | 22—116 XR |
| 1,913,138 | 6/33 | Apple | 22—116 |
| 2,486,798 | 11/49 | Mollenhauer | 22—116 |
| 2,504,824 | 4/50 | George | 22—116 |
| 2,841,838 | 7/58 | Covitt | 22—165 XR |

FOREIGN PATENTS 457,630   12/36   England.

MICHAEL V. BRINDISI, *Primary Examiner.*

MARCUS U. LYONS, *Examiner.*